United States Patent [19]
Röck et al.

[11] Patent Number: 4,846,538
[45] Date of Patent: Jul. 11, 1989

[54] FASTENING DEVICE FOR ADJUSTABLE FRONT PLATES OF DRAWERS

[75] Inventors: Erich Röck, Höchst; Klaus Brüstle, Lauterach, both of Austria

[73] Assignee: Julius Blum Gesellschaft GmbH, Höchst, Austria

[21] Appl. No.: 146,203

[22] Filed: Jan. 20, 1988

[30] Foreign Application Priority Data
  Feb. 4, 1987 [AT] Austria .................. A219/87

[51] Int. Cl.[4] .................................. A47B 48/00
[52] U.S. Cl. .................. 312/263; 312/330.1; 403/407.1
[58] Field of Search .............. 403/407.1, 409.1, 245, 403/246; 312/263, 330 R

[56] References Cited

U.S. PATENT DOCUMENTS

| | | | |
|---|---|---|---|
| 2,874,388 | 2/1959 | Edelen | 403/407 X |
| 4,264,113 | 4/1981 | Suttles | |
| 4,458,965 | 7/1984 | Ohlendorf et al. | |
| 4,502,807 | 3/1985 | Salice | 403/407.1 |
| 4,507,010 | 3/1985 | Fujiya | 403/409.1 X |
| 4,520,608 | 6/1985 | Baus | |
| 4,609,236 | 9/1986 | Twellmann | 312/330 R |
| 4,649,712 | 3/1987 | Tate, Jr. et al. | |
| 4,690,469 | 9/1987 | Grass | |
| 4,705,328 | 11/1987 | Röck et al. | 312/330 R |
| 4,741,583 | 5/1988 | Röck et al. | |

FOREIGN PATENT DOCUMENTS

| | | |
|---|---|---|
| 96898 | 12/1983 | European Pat. Off. |
| 160733 | 11/1985 | European Pat. Off. |
| 3148066 | 10/1982 | Fed. Rep. of Germany |

*Primary Examiner*—Joseph Falk
*Attorney, Agent, or Firm*—Wenderoth, Lind & Ponack

[57] ABSTRACT

A fastening device for adjustable front plates of drawers. A supporting part is fastened to the drawer side walls at each side of the drawer. The front plate is by means of screws or dowels fastened to holding parts which are engageable in said supporting parts. A holding means which engages at a hook of the corresponding holding part is arranged at each side of the drawer. Each holding means comprises a clamping hook which is mounted on a vertically adjustable sledge, and is clampable by means of an eccentric and pulls by means of said hook of said holding part the front plate to said drawer side wall.

15 Claims, 2 Drawing Sheets

FASTENING DEVICE FOR ADJUSTABLE FRONT PLATES OF DRAWERS

FIELD AND BACKGROUND OF THE INVENTION

The invention relates to a fastening device for adjustable front plate of drawers, at each side of the drawer a supporting unit being fastened to the drawer side walls and the front plate being by means of screws or dowels fastened to holding parts which are engageable in the supporting units, and further at each side of the drawer a holding means being arranged which engages at a hook of the corresponding holding part and comprises a clamping hook which is clampable by means of an eccentric for the like and pulls by means of the hook of the holding part the front plate to the drawer side wall.

A fastening device of the afore-mentioned kind is known for example from DE-A No. 31 48 066 by the same applicant. By means of a fastening device of this kind the front plate can be quickly anchored to the drawer side walls, when the drawer parts are assembled, and it is further possible to adjust the position of the front plate so that equal vertical and horizontal gaps are obtained between several drawers.

Lately, an increasing number of drawers with double side walls have been put on the market. The drawer side walls may be of plastic material or of metal. In the latter case, they often also fulfil the function of a pull-out rail of a guide assembly.

SUMMARY OF THE INVENTION

It is the object of the invention to provide a fastening device of the above-mentioned kind which is particularly suitable for use with drawer side walls of the afore-mentioned kind and permit particularly quick and secure anchoring of the front plate and preferably a vertical adjustment of the same.

According to the invention this is achieved in that each clamping hook is mounted on a sledge which is displaceable on the support.

For mounting the front plate, the holding parts must only be pushed into the side walls, where they are held by the hooks.

When the front plate has been adjusted, the clamping hooks are pulled backwards by turning the eccentrics, and the front plate is clamped to the drawer side walls.

Lateral adjustability of the front plate is advantageously obtained in that the holding parts are made of two parts, and that the clamping elements are arranged between the two parts which are held in each other by from closure and which are laterally displaceable.

An embodiment of the invention provides that the clamping hooks and the hooks of the holding parts have inclined engaging surfaces.

It is advantageously provided that the sledge has a nose on which the hook of the holding part abuts.

A preferred embodiment of the invention provides that the sledge is provided with a supporting member for the clamping hook.

A particularly good connection of the two parts which form a holding part is obtained in that one of the two parts has a T-shaped shoulder which is guided in a corresponding recess of the other part. This also provides good guiding of the front plate during lateral displacement.

Quick mounting of the front plate is obtained in that in the region of the hooks at which the clamping hooks engage, the holding parts are provided with wedge surfaces. When the holding parts are pushed into the side walls the hooks are moved over the wedge surfaces.

BRIEF DESCRIPTION OF THE FIGURES OF THE DRAWING

In the following an embodiment of the invention will be described in more detail with reference to the figures of the drawing without being limited thereto.

DESCRIPTION OF THE PREFERRED EMBODIMENT

Figure 1:
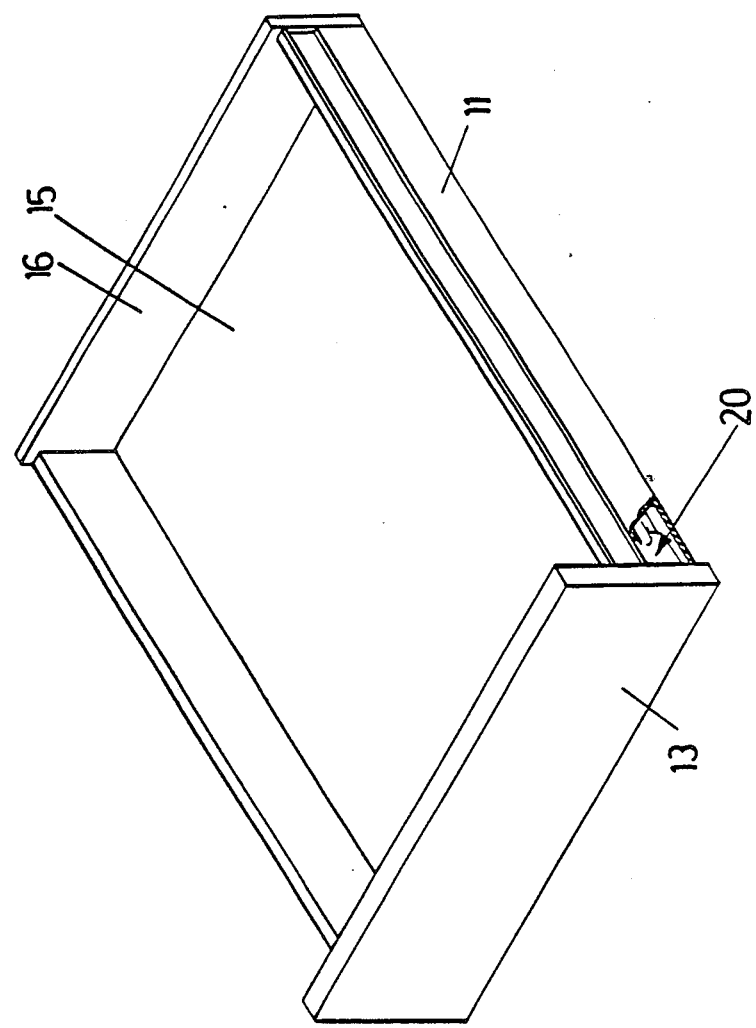
FIG. 1 shows a diagrammatic view of a drawer with a fastening device according to the invention for the front plate.
Figure 2:
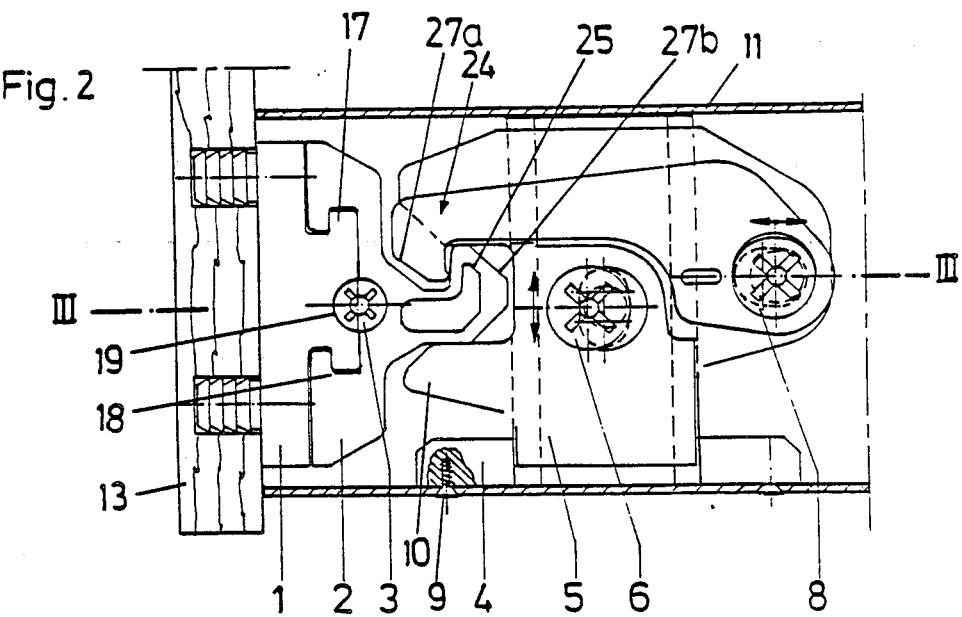
FIG. 2 shows a longitudinal sectional view of a drawer side wall in the front region and of a fastening device according to the invention.
Figure 3:
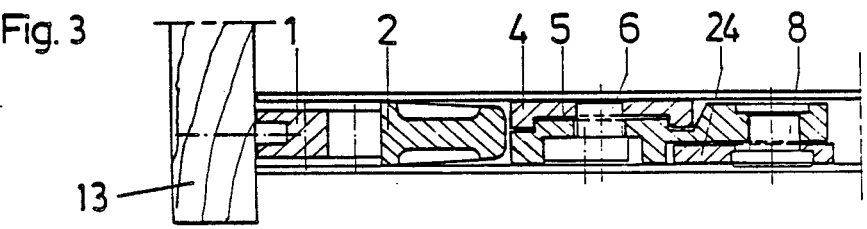
FIG. 3 shows a sectional view along line III—III of FIG. 2.
Figure 4:
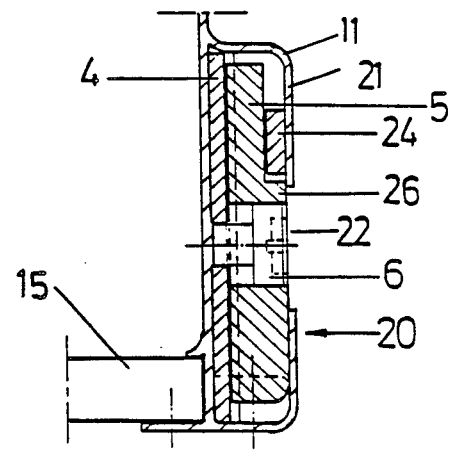
FIG. 4 shows a vertical sectional view of a fastening device according to the invention.

The essential parts of the drawer are the two drawer side walls 11, the front plate 13, the drawer bottom 15 and the rear wall 16. A fastening device 20 according to the invention is fitted to the front side of each drawer side wall 11.

Holding parts are fastened to each side of the front plate 13. The holding parts comprise two parts 1 and 2, part 1 being directly fastened to the front plate and part 2 being held at part 1. Part 1 has a T-shaped shoulder 17 which is guided in a corresponding groove 18 in part 2. Hence, the front plate 13 is in the mounted position laterally displaceable in the parts 2 by means of the parts 1.

Eccentrics 3 are arranged between the parts 1 and 2 in recesses 19. After alteral adjustment, the eccentric 8 are turned so that parts 1, 2 are fixed in respect to each other.

The holding means 20 is pushed into the drawer side walls 11.

The outer wall 21 of the drawer side walls 11 has an opening 22 through which an adjusting tool gets access to the eccentrics 3,6,8.

For mounting the front plate 13, the holding parts 1,2 are pushed into the side walls 11 and into the supporting parts 7 and engage behind the clamping hook 24 by means of a hook 25. The front plate 13 is thus held at the drawer side walls 11.

The possibility of laterally adjusting the front plate 13 by displacing the parts 1 in respect of the parts 2 has already been described.

A sledge is vertically adjustably mounted on the support 4 which is screwed to the drawer side wall 11 by means of a screw 9. The clamping hook 24 which is pivotable about the eccentric 8 is mounted at the sledge 5 by means of said eccentric 8.

Vertical adjustment of the sledge 5 is effected by means of the eccentric 6.

Sledge 5 is provided with a nose 10 on which hook 25 of part 2 abuts directly. Hence, when sledge 5 is moved in respect of the height of the drawer side wall by means of eccentric 6, hook 25 and thus the front plate is either lifted or lowered.

Sledge 5 further has a supporting member 26 on which the clamping hook 24 abuts, when the holding parts 1, 2 are not inserted into the side walls 11.

The clamping hook 24 and the hook 25 are provided with wedge surfaces 27 which facilitate engaging of the hook 25 into the clamping hook 24. When the front plate 13 is being engaged, the clamping hook 24 is at each side of the drawer automatically lifted by means of the wedge surfaces 27.

After lateral and vertical adjustment, the eccentrics 8 at each side of the drawer are turned in such a manner that the clamping hook 24 is moved backwards and thus the front plate 13 is pressed to the front side of the drawer side walls 11. Thus secure and undisplaceable positioning of the front plates 13 is obtained.

What is claimed is:

1. A fastening device for use in adjustably mounting each of opposite sides of a front plate of a drawer to a respective side wall of the drawer, said fastening device comprising:

a holding member to be fastened to a respective side of the front plate, said holding member having a hook;

a supporting member to be fastened to a respective side wall of the drawer;

a slide member mounted on said supporting member for vertical movement relative thereto;

a clamping member mounted on said slide member and having a hook to be hookingly engaged by said hook of said holding member upon said holding member being moved toward the drawer side wall and thus supporting the drawer front plate an initially fastened position; and means, mounted on said slide member, for moving said clamping member relative to said slide member in a direction away from the front plate and thereby for, when said hooks are hookingly engaged, moving said holding member and thus the front plate to a final fastened position, whereat further movement of the front plate is prevented by the front of the side wall.

2. A device as claimed in claim 1, wherein said moving means comprises an eccentric rotatably mounted on said slide member.

3. A device as claimed in claim 2, wherein said clamping member is pivotally mounted about said eccentric.

4. A device as claimed in claim 1, wherein said clamping member is pivotally mounted on said slide member, and said clamping member and said holding member have cooperating means for, upon said holding member being inserted into the drawer side wall, pivoting said clamping member away from said holding member until said hooks of said holding member and said clamping member become engaged.

5. A device as claimed in claim 4, wherein said cooperating means comprise wedge surfaces on said hooks, said wedge surfaces abutting when said holding member is being inserted into the drawer side wall and being inclined to the direction of insertion.

6. A device as claimed in claim 1, further comprising means, mounted on said supporting member, for sliding said slide member relative to said supporting member and thereby for moving said holding member and thus the front plate vertically upwardly or downwardly.

7. A device as claimed in claim 6, wherein said sliding means comprises an eccentric rotatably mounted on said supporting member.

8. A device as claimed in claim 1, wherein said slide member has extending therefrom a supporting surface supporting said holding member.

9. A device as claimed in claim 1, wherein said slide member has an abutment surface for abutment by said clamping member.

10. A device as claimed in claim 1, wherein said holding member comprises first and second parts slidably engaged with each other.

11. A device as claimed in claim 10, wherein said first part has a T-shaped protrusion slidably fitting into a correspondingly shaped recess in said second part.

12. A device as claimed in claim 10, wherein said first and second parts are slidable relative to each other in opposite lateral directions.

13. A device as claimed in claim 10, further comprising clamping means for fixing the relative position between said first and second parts.

14. A device as claimed in claim 13, wherein said first and second parts have formed therein facing recesses, and said clamping means comprises an eccentric mounted in said facing recesses.

15. A device as claimed in claim 14, wherein said recesses together form a cylinder.

* * * * *